(12) United States Patent
Setterberg et al.

(10) Patent No.: US 9,508,122 B2
(45) Date of Patent: Nov. 29, 2016

(54) CREATING TEMPLATES FOR FINGERPRINT AUTHENTICATION

(71) Applicant: FINGERPRINT CARDS AB, Göteborg (SE)

(72) Inventors: Eric Setterberg, Västra Frölunda (SE); Hamid Sarvé, Göteborg (SE); Kenneth Jonsson, Kungälv (SE)

(73) Assignee: FINGERPRINT CARDS AB, Göteborg (SE)

(*) Notice: Subject to any disclaimer, the term of this patent is extended or adjusted under 35 U.S.C. 154(b) by 0 days.

(21) Appl. No.: 14/922,848

(22) Filed: Oct. 26, 2015

(65) Prior Publication Data

US 2016/0132711 A1 May 12, 2016

(30) Foreign Application Priority Data

Nov. 7, 2014 (SE) ...................................... 1451336

(51) Int. Cl.
*G06K 9/00* (2006.01)
*G06T 3/40* (2006.01)

(52) U.S. Cl.
CPC ......... *G06T 3/4038* (2013.01); *G06K 9/00026* (2013.01); *G06K 9/00087* (2013.01); *G06K 9/00926* (2013.01); *G06T 2200/32* (2013.01)

(58) Field of Classification Search
CPC ................ G06K 9/00026; G06K 2009/2045; G06K 9/00073; G06F 21/32
See application file for complete search history.

(56) References Cited

U.S. PATENT DOCUMENTS

| | | |
|---|---|---|
| 6,075,905 A | 6/2000 | Herman et al. |
| 6,668,072 B1 | 12/2003 | Hribernig et al. |
| 2003/0002718 A1 | 1/2003 | Hamid |
| 2003/0123715 A1* | 7/2003 | Uchida .............. G06K 9/00026 382/124 |
| 2005/0047631 A1* | 3/2005 | Zyzdryn ............ G06K 9/00026 382/124 |
| 2005/0152584 A1* | 7/2005 | Svedin .................... G06F 21/32 382/124 |
| 2005/0185828 A1 | 8/2005 | Semba et al. |

(Continued)

FOREIGN PATENT DOCUMENTS

| | | |
|---|---|---|
| EP | 1306804 B1 | 1/2010 |
| WO | 0068873 A1 | 11/2000 |

OTHER PUBLICATIONS

Kyoungtaek Choi et al., "Fingerprint Mosaicking by Rolling and Sliding," Audio-and Video-Based Biometric Person Authentication; Lecture Notes in Computer Science; LNCS, Jun. 28, 2005 Springer-Verlag, Berlin-Heidelberg, ISBN 978-3-540-27887-0, ISBN 3-540-27887-7, 10 pages.

(Continued)

*Primary Examiner* — Stephen R Koziol
*Assistant Examiner* — Jonathan S Lee
(74) *Attorney, Agent, or Firm* — Remarck Law Group PLC

(57) ABSTRACT

The present invention concerns a method, a system, a device for enrolling biometric data of a body part to be used for user authentication, using a two-dimensional sensor. The method comprises capturing, using the two-dimensional sensor, images representing different views of the body part, stitching the images into at least one mosaic, generating at least one constructed image by determining at least one area of interest in the mosaic, the area of interest representing an additional view of the body part, and extracting image data of the area of interest, and enrolling the constructed images in a set of templates to be used for user authentication.

15 Claims, 6 Drawing Sheets

(56) References Cited

U.S. PATENT DOCUMENTS

| | | | |
|---|---|---|---|
| 2005/0238212 A1 | 10/2005 | Du et al. | |
| 2007/0263912 A1* | 11/2007 | Biarnes | G06K 9/00026 382/124 |
| 2009/0228968 A1* | 9/2009 | Ting | G06F 21/32 726/8 |
| 2009/0279742 A1* | 11/2009 | Abiko | G06K 9/00026 382/107 |
| 2011/0044514 A1* | 2/2011 | Rahmes | G06K 9/00067 382/124 |
| 2011/0182486 A1* | 7/2011 | Valfridsson | G06K 9/00026 382/124 |
| 2012/0308092 A1* | 12/2012 | Benkley | G06F 3/03547 382/124 |
| 2013/0259330 A1 | 10/2013 | Russo et al. | |
| 2013/0329967 A1* | 12/2013 | Abiko | G06K 9/00026 382/115 |
| 2014/0003677 A1 | 1/2014 | Han et al. | |
| 2014/0003679 A1 | 1/2014 | Han et al. | |
| 2014/0003681 A1* | 1/2014 | Wright | G06K 9/00013 382/124 |
| 2014/0119620 A1* | 5/2014 | Jung | G06K 9/00026 382/124 |

OTHER PUBLICATIONS

PCT International Search Report dated Feb. 24, 2016 for PCT International Application No. PCT/SE2015/051170 (6 pages).

U.S. Appl. No. 14/922,748, filed Oct. 26, 2015, Setterberg.

PCT International Search Report dated Feb. 24, 2016 for PCT International Application No. PCT/SE2015/051171 (5 pages).

* cited by examiner

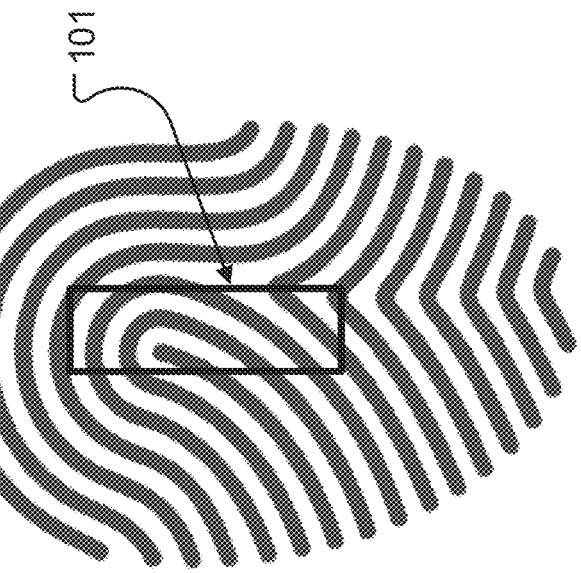
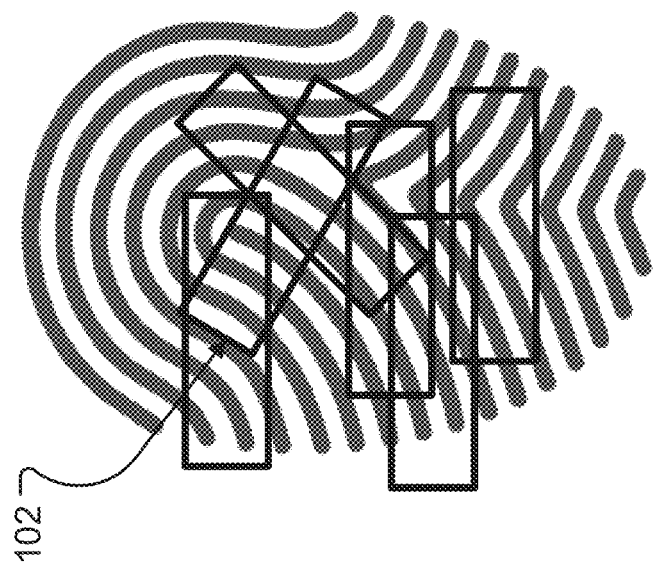
FIG. 1

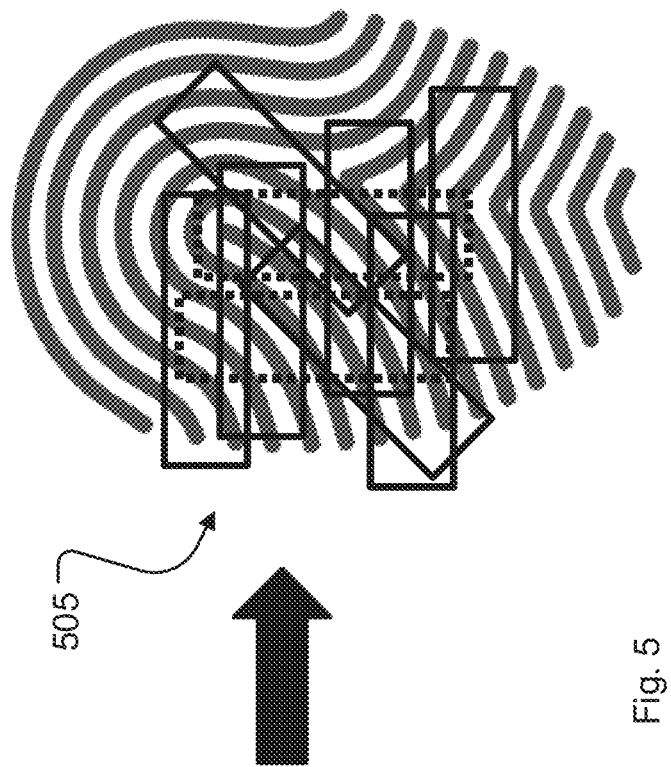
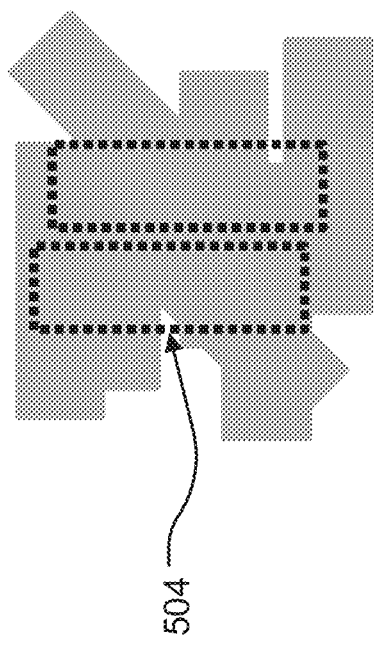
Fig. 5

CREATING TEMPLATES FOR FINGERPRINT AUTHENTICATION

CROSS-REFERENCE TO RELATED APPLICATIONS

This application claims the benefit of Swedish Patent Application No. 1451336-0, filed Nov. 7, 2014. The disclosure of the above application is incorporated herein by reference in its entirety.

TECHNICAL FIELD

The present disclosure relates to a method, a system and a device for creating templates for biometric authentication. More particularly the invention pertains to enrolling biometric data of a body part to be used for user authentication, using a two-dimensional sensor.

BACKGROUND

In the field of biometric sensing, the use of fingerprints has evolved to be one of the most widely used technologies. There are many electronic devices which require fingerprint authentication before a user is allowed access to the device. This fact can be illustrated and exemplified by considering the field of mobile communication technology, e.g. the use of intelligent mobile devices such as smartphones. In this field there is an increased demand for providing increased security for accessing the devices themselves and also for providing secure access to remote services such as banking services that are available via data communication networks.

In order to enable such secure access by way of fingerprint sensing, a user has to take part in a so-called enrolment procedure where information directly connected to a user's fingerprint is registered for later use in a matching procedure when actual access is to be determined. During such an enrolment procedure, the user is typically prompted to apply a finger to a fingerprint sensor several times until a complete fingerprint, or at least a large part of a fingerprint, has been recorded.

Examples of prior art fingerprint enrolment are described in US patent application publications 2014/0003677 and 2014/0003679. In the systems described in these publications, during the enrolment procedure, a user is provided with feedback in the form of information that tells the user which part of the fingerprint that is still to be recorded.

A fingerprint sensor is for example a capacitive touch sensor which uses electrical current when scanning a finger as opposed to an optical scanner which uses light. The capacitive touch sensor is either passive or active. A passive sensor measures the capacitance between the sensor and the finger at each sensor pixel. The capacitance is different for ridges and valleys in the fingerprint since there is an air gap between the valley and the sensor. An active sensor uses a charging cycle to apply a voltage to the skin before measurement. The electric field between the finger and the sensor follows the pattern of the ridges. An advantage with an active sensor is that neither the finger nor the sensor needs to be clean during the scanning.

During fingerprint authentication with a capacitive touch sensor a big enough area of the skin presented to the sensor must be overlapping with the area of skin presented to the sensor at enrollment, otherwise the authentication becomes impossible. The standard way of ensuring that the overlapping is enough is to let the enrollment consist of a procedure where the user applies his fingers multiple times on the sensor in different angles so that more and more skin area is covered in the enrolled images.

At authentication typically only one touch is used and the information extracted from this frame is then matched with the enrolled information. A matching algorithm is used to compare the enrolled images with the authentication image. The matching algorithm may be an image based algorithm where the authentication image is graphically compared to the enrolled images. The matching algorithm may also compare certain features of the authentication image and the enrollment images. Feature recognition is then performed on the images to extract the minutiae, i.e. the major features, of the fingerprint. The minutiae are for example ridge ending, ridge bifurcation, short ridge, island, ridge enclosure, spur, crossover, delta and core.

The matching used is typically not tuned to large differences between the area coverage of the enrolled information and the area coverage of the information used for authentication. If, during the feature comparison step of the matching process, there is an unbalance between the number of features enrolled and the number of features extracted from the authentication image, then the result of the comparison will be that these feature sets does not compare well. The reason behind this is that for impostor attempts on large sensors, partially obscured fingerprint should not be easier to match. To retain this characteristic of the matcher and to make sure that enough features are matched to prevent impostor attempts with partial prints, extraction is performed on the enrollment images one by one resulting in an ensemble or set of templates. When matching is performed the data extracted from the authentication image is then compared to each of these templates and the final matching score is computed from these individual match scores with some method, using for example maximum value or mean value.

One drawback of the abovementioned methodology is when the location of an authentication image is in between two or more enrollment images. All the needed information is enrolled but not enough in one single template.

Some small capacitive touch sensors also have elongated shape. When matching information derived from images acquired by such sensors, the maximum overlap is very sensitive to rotation of the finger. If, for instance, such a sensor is 4×10 mm the maximum overlap of images from a finger with the same orientation is the full 40 mm$^2$ but if the orientation differs with 90 degrees then the maximum overlap is reduced to just 4×4=16 mm$^2$.

The problems with ensuring that there is enough overlap between the enrollment images and the authentication image are especially prominent when the authentication system does not have any hardware guidance for the finger. Such is typically the case when the system is used with for example a Smartphone.

There is a need for a system which optimizes the fingerprint authentication system to perform better matches when the authentication image is not well aligned with the enrolled images.

There is also a need for a system which simplifies and optimizes the fingerprint authentication system to save computational power and to speed up the process.

SUMMARY

An object of the present disclosure is to provide a method, a system and a device which seeks to mitigate, alleviate, or eliminate one or more of the above-identified deficiencies in the art and disadvantages singly or in any combination.

These and further objects are achieved by a method, a system and a device for enrolling biometric data of a body part to be used for user authentication. The present disclosure is defined by the appended claims. Various advantageous embodiments of the disclosure are set forth by the appended claims as well as by the following description and the accompanying drawings.

According to some aspects the disclosure provides for a method in a biometric sensing system, of enrolling biometric data of a body part to be used for user authentication using a two-dimensional sensor.

According to some aspects, the method comprises capturing, using the two-dimensional sensor, images representing different views of the body part, stitching the images into at least one mosaic, generating at least one constructed image by determining at least one area of interest in the mosaic, the area of interest representing an additional view of the body part, and extracting image data of the area of interest and enrolling the constructed images in a set of templates to be used for user authentication. By creating a mosaic and then generate constructed images which represents areas of interest, i.e. high probability of a match, in the mosaic, a way to increase probability of a match is provided.

According to some aspects, the enrolling further comprises enrolling at least one of the captured images in the set of templates to be used for user authentication. Thus, the set of images consists of both captured images and constructed images. The constructed images may be matched first from the set of images to the authentication image and thus the probability of finding a match fast is increased. The system is thus simplified and optimized to save computational power and to speed up the process.

According to some aspects, the enrolling comprises for each image, performing feature extraction and storing the extracted features as a template in the set of templates. A set of templates with the important features of the images is thereby created.

According to some aspects, the determining comprises selecting an area of interest that corresponds to a possible body part placement, on the two-dimensional sensor. When an authentication image is captured of a body part of the user, it is compared to the set of images to authenticate the user. If only the captured enrollment images are used during the comparison there is a risk that the comparison will result in a false negative due to for example rotation of the authentication image compared to the enrollment images. So the method constructs enrollment images from the mosaic that represent likely matches to authentication images and thereby enables better chances of matches when the authentication image is not well aligned with the original set of images.

According to some aspects, the method comprises capturing an authentication image using the two-dimensional biometric sensor. Thus the authentication image is captured for the matching.

According to some aspects, the determining comprises selecting the area of interest to cover intermediate areas that are composed from two or more captured images to optimize the probability of overlap between the templates and the authentication image. As previously discussed, the area of interest is selected to provide probable enrollment images to the set of images so that the authentication process is optimized. In this way, problems with translational quantization effects are overcome.

According to some aspects, the determining comprises selecting the area of interest to cover rotations of the authentication image to optimize the probability of overlap between the templates and the authentication image. In this way, problems with rotations are overcome.

According to some aspects, the extracting comprises copying data of the at least one area of interest and storing the copied data in the biometric sensing system. By storing a copy of the area of interest, the size of the stored copied image may be chosen to match that of the captured image. In other words, the data is copied so that the size of the captured images and the constructed images are the same.

According to some aspects, the method comprises matching the captured authentication image to each template in the set until a match is found or until all templates have been matched. Thus, a user can be authenticated.

According to some aspects, the matching comprises, forming, for each template in the set of templates, a candidate template by performing feature extraction on the authentication image, and matching the candidate template with the enrolled template. By matching a candidate template and an enrollment template with extracted features, a match between the template and the authentication image can be found.

According to some aspects, the biometric data is a fingerprint. Thus, the system can be used as a fingerprint authentication system.

According to some aspects the disclosure provides for a biometric sensing system configured to enroll biometric data of a body part to be used for user authentication.

According to some aspects, the biometric sensing system comprises a two-dimensional biometric sensor and a processing circuitry. The processing circuitry is configured to capture, using the two-dimensional sensor, images representing different views of the user's body part, stitch the images into at least one mosaic, generating at least one constructed image by determining at least one area of interest in the mosaic, the area of interest representing an additional view of the body part, and extracting image data of the area of interest, and enroll the constructed images in a set of templates to be used for user authentication. The advantages of the steps have been previously described.

According to some aspects, the two-dimensional biometric sensor is a capacitive touch sensor. Capacitive touch sensors are small and cheap and provide a good fingerprint image when a finger is scanned.

According to some aspects the disclosure provides for a portable electronic device comprising the biometric sensing system according to above.

According to some aspects the disclosure provides for a computer readable program, which, when executed on a portable electronic device, causes the portable electronic device to perform the method according to above.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1 illustrates a fingerprint, captured images of the fingerprint and an authentication image of the fingerprint.

FIG. 5 illustrates a mosaic with constructed images and a fingerprint with a set of enrolled templates.

DETAILED DESCRIPTION

Figure 2:
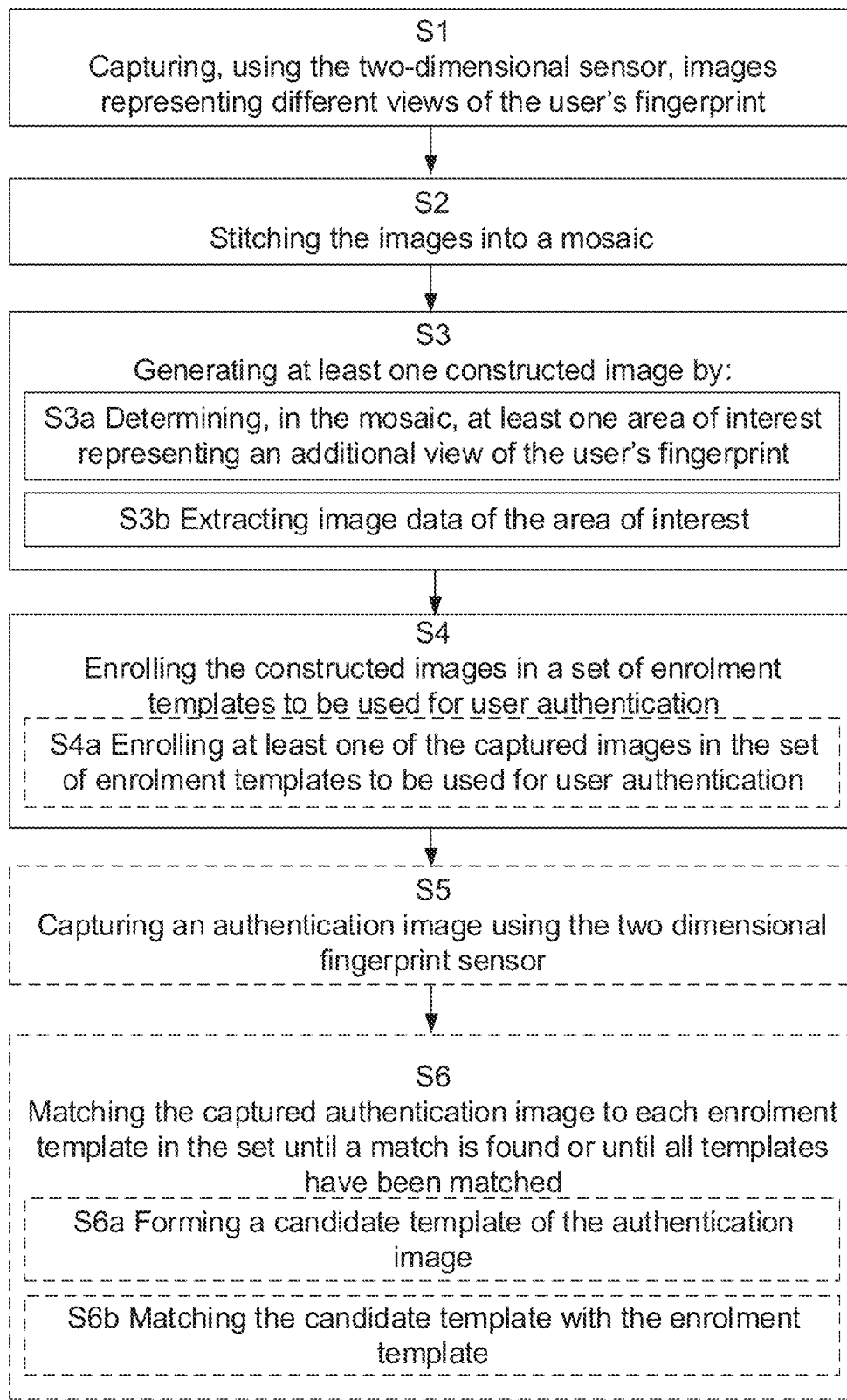
FIG. 2 is a flow chart illustrating the proposed method.

Aspects of the present disclosure will be described more fully hereinafter with reference to the accompanying drawings. The method, system and device disclosed herein can, however, be realized in many different forms and should not be construed as being limited to the aspects set forth herein. Like numbers in the drawings refer to like elements throughout.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the present invention will be exemplified using a portable communication device such as a mobile phone. However, it should be appreciated that the invention is as such equally applicable to any electronic devices which have biometric sensing capabilities. Examples of such devices may for instance be any type of mobile phone, smartphone, laptop (such as standard, ultra portables, netbooks, and micro laptops) handheld computers, portable digital assistants, tablet computers, touch pads, gaming devices, accessories to mobile phones, e.g. wearables in the form of headphones/-sets, visors/goggles, bracelets, wristbands, necklaces, etc. For the sake of clarity and simplicity, the embodiments outlined in this specification are exemplified with, and related to, mobile phones.

As discussed in the background, enrollment images are needed to have something to compare the authentication image with. Multiple images are acquired during enrollment. Apart from some outliers these images can be stitched into one or more larger mosaics. Mosaics are created by stitching images using conventional stitching algorithms. Stitching of images is when several images are combined into one. Images that have overlapping fields of view can be stitched into one combined image. One way to stitch images is to recognize geometrical features of the images to be stitched and then put them together so that the geometrical features overlap.

U.S. Pat. No. 6,075,905A discloses a method and apparatus for mosaic image construction. The method consists of an initial alignment of the images to be stitched, establishment of a coordinate system for the image mosaic, alignment of the images to the coordinate system and then merging the aligned images to form the mosaic. Alignment is in general achieved through image processing techniques that automatically find image transformations (e.g., translation, rotation, scale) that bring patterns in overlapping images into precise alignment.

U.S. Pat. No. 6,668,072B discloses a method for producing a reference image for pattern recognition tasks. In this document symbolic intermediate representations for each image of the pattern are produced and compared to determine relative shift and rotation with respect to each other. The intermediate representations are synthesized if the quality of a match is adequate.

FIG. 1 illustrates the problem with matching authentication images 101 to captured enrolment images 102. The authentication image is located in between several captured enrolment images and thus a user may receive a false negative from the matching.

The proposed technique solves this problem by creating images and adding the constructed images to the captured enrolment images as if they were real images. The images may be constructed to cover areas that are considered likely for finger placement or areas that are not well covered by the captured images. The proposed technique will now be described in further detail referring to FIGS. 2 to 6.

Figure 3:
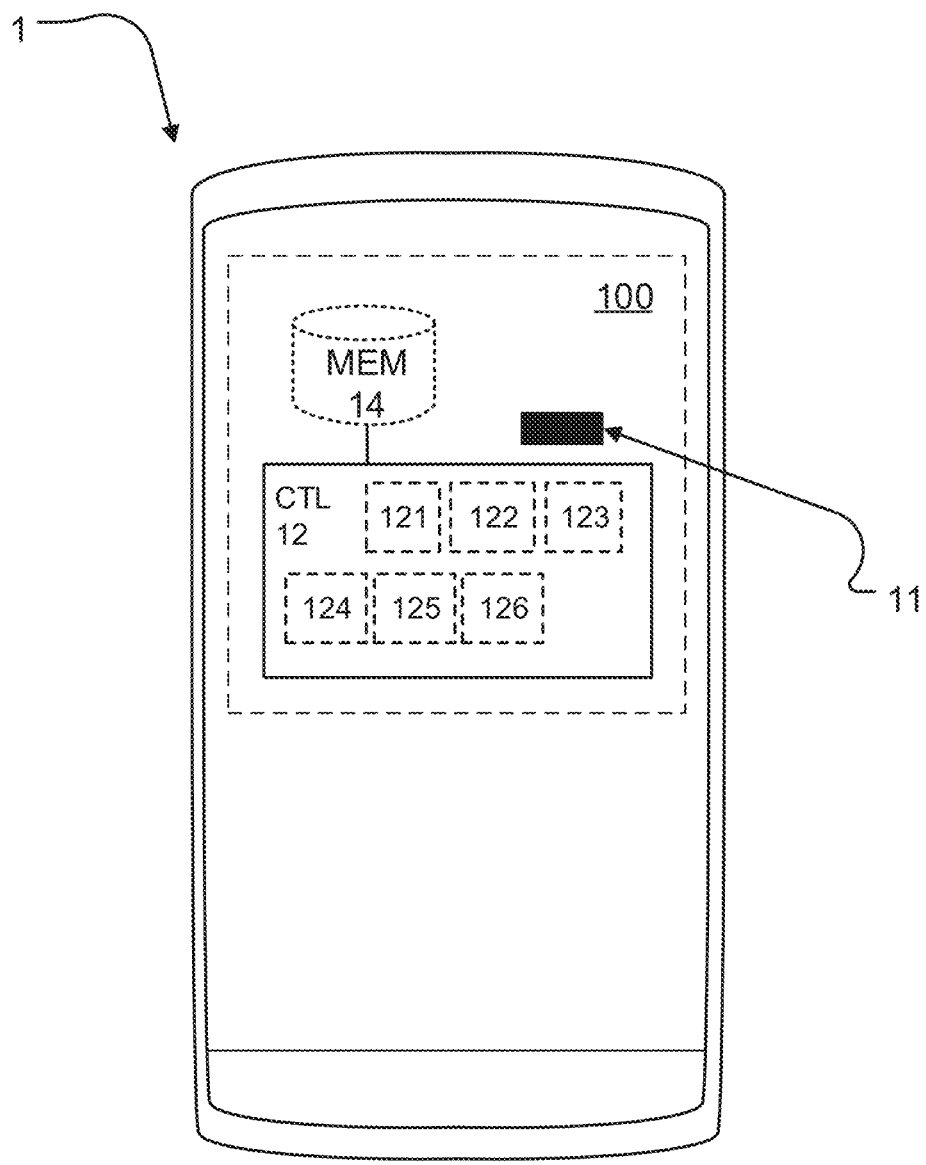
FIG. 3 is an example embodiment of a mobile phone with a two-dimensional sensor.

FIG. 2 is a flow diagram depicting example operations which may be taken by a biometric sensing system 100 during enrollment of biometric data of a body part to be used for user authentication using a two-dimensional sensor. A portable electronic device comprising a biometric sensing system is illustrated in FIG. 3. The biometric sensing system 100 comprises a two-dimensional biometric sensor 11 and a processing circuitry 12. A biometric sensing system on a portable electronic device may be used to, for example, unlock the device for use by a specific user. Another implementation is to authenticate the user when the portable electronic device is handling sensitive information, such as handling bank information or other sensitive personal information.

It should be appreciated that FIG. 2 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

The method illustrated in FIG. 2 comprises capturing S1, using the two-dimensional sensor 11, images 102, 402, 602 representing different views of the body part. The processing circuitry 12 is configured to capture S1, using the two-dimensional sensor, the images. According to some aspects, the processing circuitry comprises a capturer 121 for capturing the images. The images are representations of the body part that has been scanned by the sensor. If the sensor is for example a capacitive sensor, the image is formed by processing the difference in capacitance at different locations over time at the sensor. The difference in capacitance is normally illustrated as a grayscale image wherein the brightness of the pixels represents the distance of the skin from that part of the sensor. Thus in the image ridges will be dark and the valleys between them whiter representing the difference in capacitance.

Figure 4:
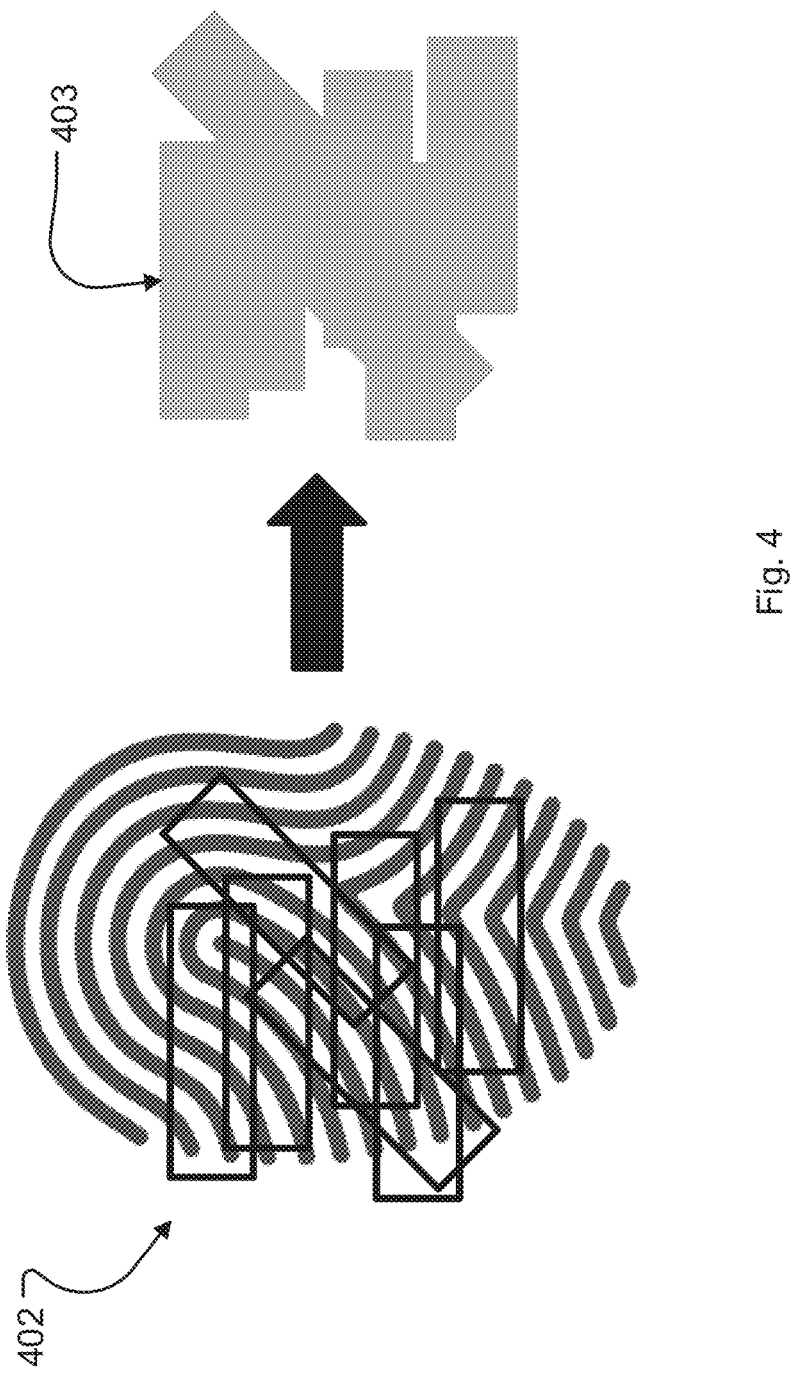
FIG. 4 illustrates a fingerprint with captured images and a mosaic of the captured images.

The following step in FIG. 2 comprises stitching S2 the captured images into a mosaic. The processing circuitry is configured to stitch S2 the images. According to some aspects, the processing circuitry comprises a stitcher 122 for the stitching. Examples if stitching have been previously described. FIG. 4 illustrates when captured images 402 are stitched into a mosaic 403. The mosaic is either directly stitched together from the captured images or extracted features of the captured images are stitched together to form the mosaic comprising extracted features. When the mosaic comprises stitched features, the extracted features are stitched together to form the mosaic in feature space. Features are in that case extracted on the captured images during a feature extraction operation before stitching. Extracting features from an image is known to the skilled person in image processing. Examples of extraction feature types are local descriptions of shape and texture. When performing stitching it is preferred to have a good spread of the features so that the images are stitched correctly everywhere. According to some aspects, at least one mosaic is formed by stitching features of the captured images and at least one mosaic is formed by stitching the captured images.

At least one constructed image is generated S3 by determining S3a at least one area of interest in the mosaic, the area of interest representing an additional view of the body part, and extracting S3b image data of the area of interest. The processing circuitry 12 is configured to generate S3 the at least one constructed image. According to some aspects the processing circuitry comprises a generator 123 for generating the constructed image. In other words, an area that corresponds to a likely authentication image is identified. The data is then extracted e.g. by reading it or by copying it. In principle this step may imply that an area in the mosaic corresponding to a possible body part placement is identified and read. The additional view of the body part means views that are not exactly the same as those of the captured images. According to some aspects the area of interest is determined using a mosaic made of features of the captured images. According to some aspects the image data is extracted from a mosaic made of the captured images.

According to some aspects, the determining S3a comprises selecting an area of interest that corresponds to a possible body part placement, on the two-dimensional sensor. Possible body part placements mean any placement of a body part that is possible. In other words, any placement that a user can place the body part to be scanned by the sensor is a possible body part placement.

When an authentication image 101 is captured of a body part of the user, it is compared to the set of enrolled templates to authenticate the user. If only the captured images are used during the comparison there is a risk that the comparison will result in a false negative due to for example rotation of the authentication image compared to the enrollment images. So the method constructs additional images and/or templates from the mosaic that represent likely or probable matches to authentication images and thereby enables better chances of matches when the authentication image is not well aligned with the originally captured enrolment images. Probability may e.g. be determined using data relating to previously captured biometric data.

According to some aspects, the determining S3a comprises selecting the area of interest to cover intermediate areas that are composed from two or more captured images to optimize the probability of overlap between the constructed images and the authentication image 101. As previously discussed, the area of interest is selected to provide templates that have a high probability to match an authentication image, so that the authentication process is optimized. In this way, problems with translational quantization effects are overcome. For example, if the system, during the capturing of images representing different views of the body part, captures two images where one covers the right side of the body part and the other cover the left side the selecting of the area of interest may select an area that covers the middle of the body part and extract the information from that part to generate the constructed image. An authentication image which is taken at the middle of the body part will then well matched with that constructed image.

According to some aspects, the determining S3a comprises selecting the area of interest to cover rotations of the authentication image 101 to optimize the probability of overlap between the constructed images and the authentication image. In this way, problems with rotations are overcome. This is especially important for images taken with rectangular sensors as described in the background section.

According to some aspects, the extracting S3b comprises copying data of the at least one area of interest and storing the copied data in the biometric sensing system 100. By storing a copy of the area of interest, the size of the stored copied image may be chosen to match that of the captured image. In other words, so that the size of the captured images and the size of the constructed images, are the same, or at least in the same range. Alternatively, the extracting comprises to extract features directly from the area of interest in the mosaic and storing the features in the biometric sensing system. Feature extraction has been described in the background and is known to a person skilled in the art and will not be explained further.

The following step in FIG. 2 comprises enrolling S4 the constructed images in a set of templates 505, 605 to be used for user authentication. The processing circuitry 12 is configured to enroll S4 the constructed images in the set of templates 505. According to some aspects the processing circuitry comprises an enroller 124 for the enrolment. By creating one or more mosaics and then generate constructed images which represents areas of interest in the mosaic(s), a way to provide probable matches to authentication images is provided. To optimize the set of templates is an efficient way of minimizing storage space since each template takes up storage space. It also minimizes false positives; each template increases the chance of false positives because impostors are given more chances of success. It also maximizes chances of overlap between templates and an authentication image as previously described.

To enroll a set of templates that is as optimized as possible for authentication the enrolling S4 further comprises, according to some aspects, enrolling S4a at least one of the captured images in the set of templates to be used for user authentication. Thus the set of templates consists of both captured images and constructed images. The constructed images which represent most probable matches to authentication images may be matched first, from the set of images, to the authentication image and thus the probability of finding a match fast is increased. The system is thus simplified and optimized to save computational power and to speed up the process. To determine the areas of interest in the mosaic the most probable positions of the body part may be used. The most probable positions are, according to some aspects, determined by looking at statistics of where a user most often places the body part. According to some aspects the set of templates is updated continuously if it is determined that a user often places the body part where no template is located. A new constructed image is then created and added to the set of templates.

FIG. 5 illustrates where constructed images 504 are added to a set of templates 505. The set of templates are in the figure comprised of a combination of constructed images and captured images. The templates comprises, according to some aspects, only information related to extracted features of the images. As seen in the figure, the constructed images are here rotated and shifted sideways compared to the captured images. According to some aspects, the constructed images are sensor sized cut outs of the mosaic.

According to some aspects, the enrolling S4 comprises, for each image, performing feature extraction and storing the extracted features as a template in the set of templates. A set of templates with the important features of the images is thereby created.

To authenticate a user, the method comprises, according to some aspects, capturing S5 an authentication image 101 using the two-dimensional biometric sensor. The processing circuitry 12 is configured to capture S5, using the two-dimensional sensor 11, the authentication image. According to some aspects, the processing circuitry comprises a capturer 125 for capturing S5. Thus the authentication image is captured for the matching. The authentication then comprises to match S6 the captured authentication image to each template in the set until a match is found or until all templates have been matched. The processing circuitry 12 is configured to match S6 the images. According to some aspects, the processing circuitry comprises a matcher 126 for the matching. Thus, a user is authenticated if a match is found. According to some aspects, the authentication comprises to match the authentication image to each template in the set, or to a subset of the templates, until a match is found. In other words, subsets of the templates may be used in the matching.

More specifically the matching S6 comprises, according to some aspects, forming S6a a candidate template by performing feature extraction on the authentication image 101, and matching S6b, for each template in the set of templates, the candidate template with the template. According to some aspects, the matching 6b is performed, until all templates in the set have been tried or until a match is found. By matching a candidate template and an enrollment template with extracted features, a match between the template and the authentication image can be found. According to some aspects, it is determined that a match is found if a measurement of similarity is above a threshold value. In other words, if a similarity measurement between the candidate template and the enrolled template is above a threshold value, the system determines that the authentication image is a match and the user is authenticated; i.e. that registered biometric data for the authentication image corresponds to that of captured images.

Figure 6A:
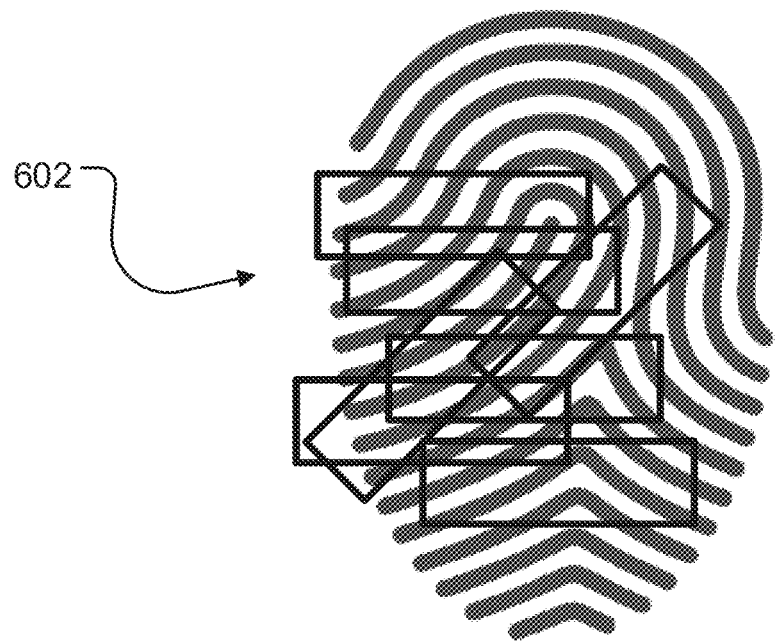
FIG. 6a illustrates a fingerprint and captured images of the fingerprint.
Figure 6B:
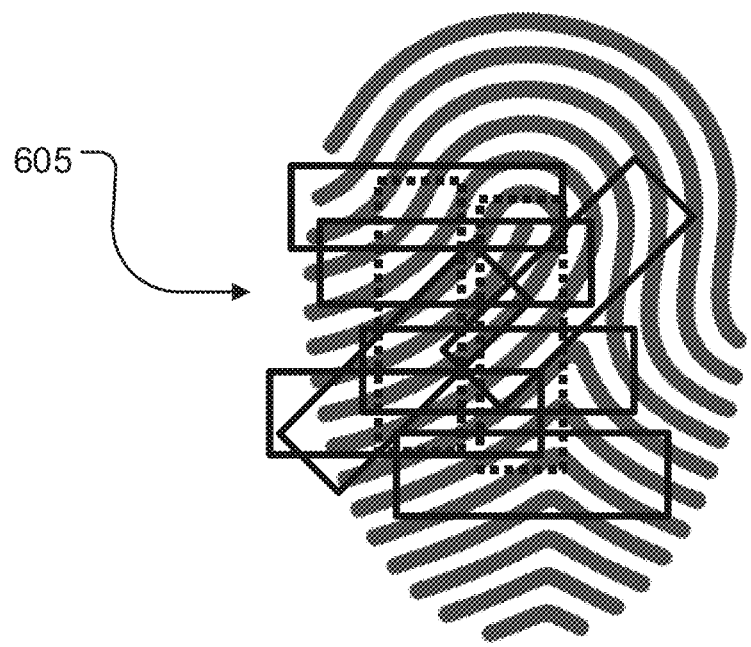
FIG. 6b illustrates a fingerprint and captured images of that fingerprint and constructed images of the fingerprint

FIG. 6a illustrates a fingerprint with captured images 602 and FIG. 6b illustrates a fingerprint with a combination of captured images and constructed images 605 according to some aspects of the disclosure.

According to some aspects, the biometric data is a fingerprint. Thus, the system can be used as a fingerprint authentication system.

According to some aspects, the two-dimensional biometric sensor 11 is a capacitive touch sensor. Capacitive touch sensors are small and cheap and provide a good fingerprint image when a finger is scanned. Capacitive touch sensors have been discussed in the background and are known to a person skilled in the art.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented according to some aspects by a computer program, comprising computer readable code which, when run on an portable electronic device, causes the portable electronic device to perform the method according to above. The computer program, embodied in a computer-readable medium, includes computer-executable instructions, such as program code, executed by computers in networked environments. A computer-readable medium may include removable and non-removable storage devices 14 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method in a biometric sensing system, of enrolling biometric data of a body part, to be used for user authentication, using a two-dimensional biometric sensor, the method comprising:

capturing, using the two-dimensional biometric sensor, images representing various views of the body part, wherein each of the images corresponds to a single and separate touch of the body part on the two-dimensional biometric sensor, stitching the captured images into at least one mosaic, generating at least one constructed image by determining at least one area of interest in the mosaic, the at least one area of interest representing an additional view of the body part that is different than the various views of the body part represented by the images, and extracting image data of the at least one area of interest, and enrolling the at least one constructed image in a set of templates to be used for user authentication.

2. The method according to claim 1, wherein the enrolling further comprises enrolling at least one of the captured images in the set of templates to be used for user authentication.

3. The method according to claim 1, wherein the enrolling comprises, for each image, performing feature extraction and storing the extracted features as a template in the set of templates.

4. The method according to claim 1, wherein the determining comprises selecting the at least one area of interest that corresponds to a possible body part placement, on the two-dimensional biometric sensor.

5. The method according to claim 1, comprising:
capturing an authentication image using the two-dimensional biometric sensor.

6. The method according to claim 5, wherein the determining comprises selecting the at least one area of interest to cover intermediate areas that are composed from two or more captured images to optimize a probability of overlap between the at least one constructed image and the authentication image.

7. The method according to claim 5, wherein the determining comprises selecting the at least one area of interest to cover rotations of the authentication image to optimize a probability of overlap between the at least one constructed image and the authentication image.

8. The method according to claim 1, wherein the extracting comprises copying data of the at least one area of interest and storing the copied data in the biometric sensing system.

9. The method according to claim 5, comprising:
matching the captured authentication image to each template in the set until a match is found or until all templates have been matched.

10. The method according to claim 9, wherein the matching comprises:
forming a candidate template by performing feature extraction on the authentication image, and
wherein the candidate template is matched with the templates from the set of templates.

11. The method according to claim 1, wherein the biometric data is a fingerprint.

12. A biometric sensing system configured to enroll biometric data of a body part to be used for user authentication, the biometric sensing system comprising:
a two-dimensional biometric sensor;
a processing circuitry configured to:
  i. capture, using the two-dimensional biometric sensor, images representing various views of the body part, wherein each of the images corresponds to a single and separate touch of the body part on the two-dimensional biometric sensor,
  ii. stitch the captured images into at least one mosaic,
  iii. generating at least one constructed image by determining at least one area of interest in the at least one mosaic, the at least one area of interest representing an additional view of the body part that is different than the various views of the body part represented by the images, and extracting image data of the at least one area of interest, and
  iv. enroll the constructed images in a set of templates to be used for user authentication.

13. The biometric sensing system according to claim 12, wherein the two-dimensional biometric sensor is a capacitive touch sensor.

14. A portable electronic device comprising the biometric sensing system of claim 12.

15. A computer readable program, which, when executed on a portable electronic device, causes the portable electronic device to perform the method according to claim 1.

* * * * *